(12) United States Patent
Davis et al.

(10) Patent No.: US 10,331,629 B2
(45) Date of Patent: Jun. 25, 2019

(54) DATABASE CONVERSION FROM SINGLE MONOLITHIC FILE MODE TO ONE TABLE PER FILE AND ONE FILE PER TABLE MODE

(71) Applicant: Quantum Corporation, San Jose, CA (US)

(72) Inventors: Camden Davis, San Jose, CA (US); Simon Cheng, San Jose, CA (US); Adam Manthei, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 686 days.

(21) Appl. No.: 14/797,738

(22) Filed: Jul. 13, 2015

(65) Prior Publication Data

US 2016/0217150 A1 Jul. 28, 2016

Related U.S. Application Data

(60) Provisional application No. 62/108,720, filed on Jan. 28, 2015.

(51) Int. Cl.
*G06F 7/00* (2006.01)
*G06F 16/178* (2019.01)
*G06F 16/11* (2019.01)
*G06F 16/21* (2019.01)
*G06F 17/24* (2006.01)

(52) U.S. Cl.
CPC ........ *G06F 16/1794* (2019.01); *G06F 16/116* (2019.01); *G06F 16/119* (2019.01); *G06F 16/214* (2019.01); *G06F 17/245* (2013.01)

(58) Field of Classification Search
CPC .................................................... G06F 17/245
USPC .......................................................... 707/640
See application file for complete search history.

(56) References Cited

U.S. PATENT DOCUMENTS

| | | | |
|---|---|---|---|
| 2005/0055351 A1* | 3/2005 | Barton | G06F 17/30345 |
| 2015/0032690 A1* | 1/2015 | Hoque | G06F 17/30575 |
| | | | 707/610 |
| 2015/0112646 A1* | 4/2015 | Kamal | G06F 17/5068 |
| | | | 703/1 |
| 2017/0212680 A1* | 7/2017 | Waghulde | G06F 16/185 |
| 2019/0012336 A1* | 1/2019 | Schreter | G06F 16/951 |

* cited by examiner

*Primary Examiner* — Eliyah S. Harper
(74) *Attorney, Agent, or Firm* — Eschweiler & Potashnik, LLC

(57) ABSTRACT

Methods, apparatus, and other embodiments facilitate transitioning a database between two modes. The two modes include a mode where table information for separate tables in the database is stored in a single monolithic file and a mode where the table information for separate tables is stored in separate files. Conventional attempts to make this type of transition lock the database for an unacceptable amount of time. Example methods and apparatus make a copy of a database that is to be transitioned, lock the copy, make a second instance of the copy, and then perform the work necessary for the transition in the second instance. This allows the original database to remain running. When the second instance is complete, the second instance is synchronized to the original database and then the transition is completed by copying the second instance to the original or failing the original over to the second instance.

20 Claims, 8 Drawing Sheets

DATABASE CONVERSION FROM SINGLE MONOLITHIC FILE MODE TO ONE TABLE PER FILE AND ONE FILE PER TABLE MODE

CROSS REFERENCE TO RELATED APPLICATIONS

This application claims the benefit of U.S. Provisional Application 62/108,720 filed Jan. 28, 2015.

BACKGROUND

Many data storage applications use or interact with a database. The database may be, for example, a structured query language (SQL) database. SQL databases may operate in a single monolithic file mode where all of the information about the tables in the database is stored in a single monolithic file. For example, a standard database (db) file called ibdata may store the system tablespace for a database infrastructure. The ibdata file may store table data pages, table index pages, table metadata, multi-versioning concurrency control (MVCC) data, a data dictionary, an insert buffer, and other data about tables or data used to manage tables. The ibdata file may store this information for all tables in the db. Recognized problems associated with storing all the information for the tables in a db in a single file include wasted space, fragmentation, and the inability to distribute data.

FIG. 1 illustrates a master SQL database (db) 100. "Master" is used in its database terminology usage (e.g., master/slave). The master SQL db 100 is configured in a single monolithic file mode (SMFM) where data about all the tables in db 100 is stored in a single file 130. For example, all the information about table1 120, and table2 122 through tableN 128 is stored in the single file 130.

SQL databases may also operate in a mode different than the single monolithic file mode. For example, an SQL database may operate in a one table per file and one file per table mode. In this mode, there is a one to one correspondence between files and tables. Each file is associated with exactly one table and each table is associated with exactly one file. One table per file and one file per table mode facilitates performing compression, defragmentation, reclaiming wasted space, and other activities.

FIG. 2 illustrates a master SQL db 200 that is configured in one table per file mode (OTPFM). In this configuration, information about tables is stored in separate files. For example, information about table1 220 is stored in file1 230, information about table2 222 is stored in file2 232 and so on through tableN 228 and fileN 238.

While SQL databases may operate in the two different modes, conventionally it has been extremely time consuming to convert from one mode to another mode. In particular, converting from single file mode to one table per file and one file per table mode has required enduring the lengthy process of locking the database, dumping the database, stopping the database, deleting the database, and then waiting while data is imported back into a new database in the different format. After the dump, delete, and import is complete, the system can finally be brought back on-line for use. However, the dump, delete, and import process may take hours to complete, which is unacceptable in many environments requiring near continuous availability.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
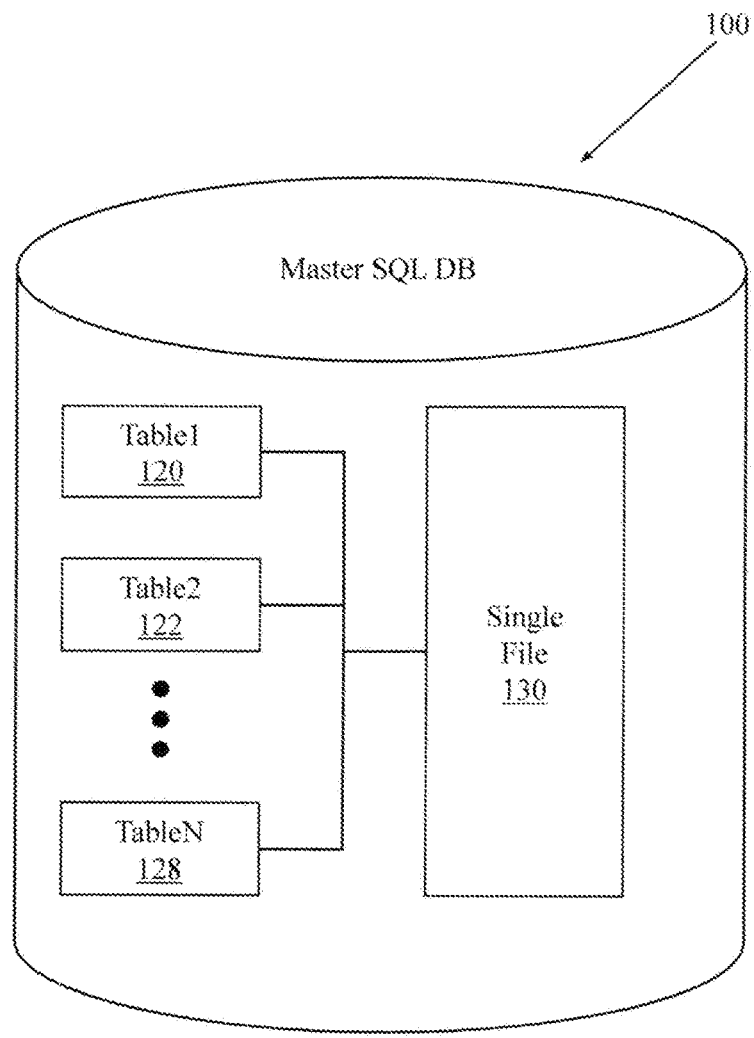
FIG. 1 illustrates a database configured in a single monolithic file mode (SMFM).
Figure 2:
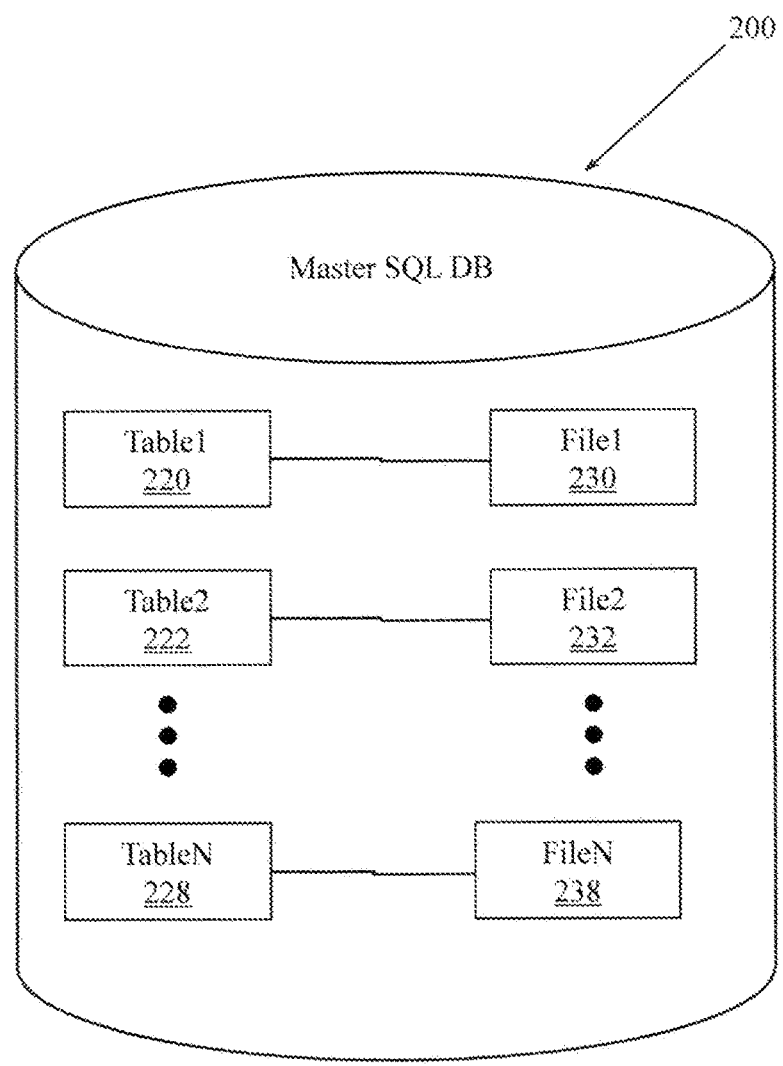
FIG. 2 illustrates a database configured in a one table per file mode (OTPFM).

Example methods and apparatus improve on conventional database conversion approaches by addressing issues associated with converting from a first mode for a database (e.g., single monolithic file mode) to a second mode for the database (e.g., one file per table, one table per file). An example approach for transitioning a master SQL database operating in single monolithic file mode (SMFM) to an SQL database operating in one table per file and one file per table mode (OTPFM) is provided. The example method could also operate in reverse to transition a master SQL database operating in OTPFM to SMFM. While an SQL database is discussed in some examples, more generally the example apparatus and methods apply to databases that operate with single monolithic file modes and one table per file modes.

One example approach includes starting a binary hot backup tool (e.g., mysqlbackup) for the master SQL database, instantiating a slave database for the master SQL database and populating the slave database using the binary hot backup tool. The binary hot backup tool just copies data, it does not perform a full dump. A binary hot backup tool produces a binary specific dump that does not allow changing the on disk format when restoring the db. Thus, the binary hot backup tool does not suffice by itself for performing SMFM to OFPTM conversion. Once the slave is populated with the information in the tables using the binary hot backup tool, then replication is turned on for the master SQL db but not on the slave. Transactions will now be saved in the replication log on the master. A dump of the slave database is then performed to produce a second copy of the slave db. The dump is performed without having to lock or stop the master SQL db. A second slave database is now created in OTPFM, importing data from the dump while the master SQL database is still running. When the creation of the second slave database is complete, the second slave database is then synchronized with the master database starting at the point where replication was enabled. This mitigates the lengthy downtime issue produced when conventional systems require the master SQL database to be locked, shutdown, or otherwise unavailable. Enabling replication while the conversion is in progress facilitates maintaining accuracy. Replication allows the second slave to be synchronized with the master using the replication logs from the start of the replication until after the second slave is created using one table per file and one file per table mode.

Once the second slave database is built and synchronized with the master SQL db, two different approaches may be taken to complete the conversion or transition. In one approach, the master SQL database may be halted and the second slave database may be copied to the master SQL database. Once the copy is completed, the new master SQL database is restarted. The master SQL database will now operate in OTPFM. In another approach, the master SQL database may be forced to fail over to the second slave database. Once the failover is complete, the master SQL database will now operate in OTPFM.

Figure 3:
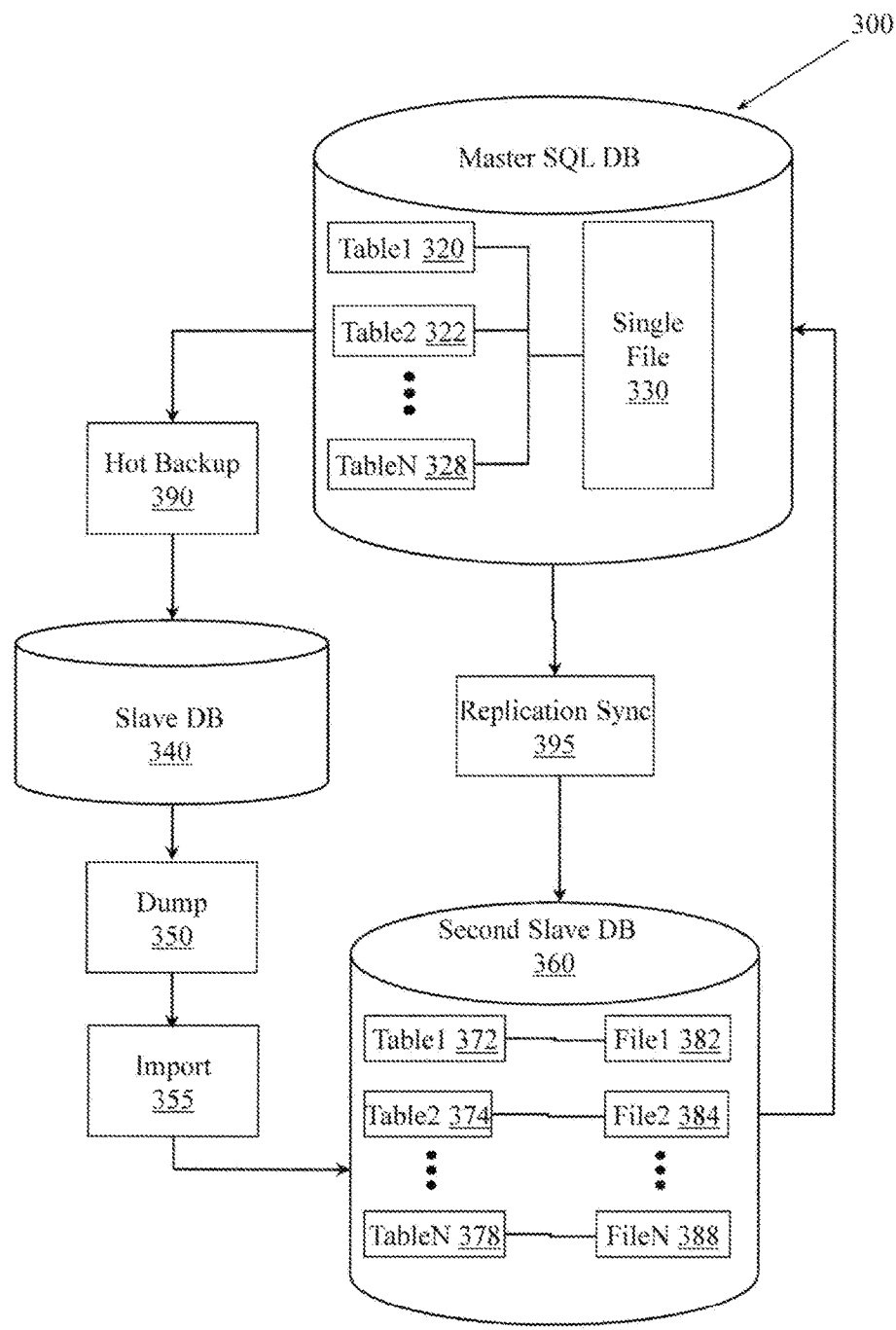
FIG. 3 illustrates one example data flow for converting a database from SMFM to OTPFM.

FIG. 3 illustrates a master SQL db 300 that is configured in SMFM. A single file 330 stores all the table data for table1 320 and table2 322 through tableN 328. After processing is complete, a second slave db 360 that is configured in OTPFM is available. The second slave db 360 has a file1 382 that stores data for table1 372, a file2 384 that stores data for table2 374 and so on down to fileN 388 that stores table data for tableN 378. Table1 372 corresponds to table1 320, table2 374 corresponds to table2 322, and so on down to tableN 378 corresponding to tableN 328.

Rather than stopping master db 300 to allow file1 382, file2 384, and so on down to fileN 388 to be created, a slave db 340 is produced for the master db 300 using a hot backup process 390. Before the slave db 340 is populated, replication is enabled on the master db 300 but no replication target is specified. Enabling replication captures transactions in replication logs on the master db 300. Once the slave db 340 is restored with data from master db 300, dump process 350 is performed on slave db 340. The data from the dump process 350 is used by an import process 355 to produce a second slave db 360. Backup 390 does not require master db 300 to be halted. Dump 350 requires slave db 340 to be halted, but not master db 300. Recall replication was enabled during this process so that transactions were captured on master db 300.

The second slave db 360 is now running in one table per file and one file per table mode and almost ready to be used in place of master db 300. However, second slave db 360 needs to be updated with the replication data held in abeyance in the transaction logs on master db 300 while the second slave db 360 was being built. Thus, after second db 360 is synchronized to the master db 300 by replication sync process 395, it can be used in place of master db 300 and the switchover made.

One example database configuration for data storage products (e.g., Quantum StorNext) uses a global tablespace file to hold the system's data. The configuration may have, for example, one file per table set to OFF, which causes table data to be written in a single monolithic data file. It may be difficult, if even possible at all, for a file system to reclaim space used by the single monolithic data file. The monolithic nature of the single file makes it difficult to impossible to distribute the database across nodes. The single monolithic data file configuration also prevents configuring the location of table data for optimal performance. Database features like compression may also not be available with a global tablespace approach.

A setting of ON for one file per table may be more desirable for some data storage products. In some embodiments, having one file per table set to ON to produce the file-per-table mode (OFPTM) is needed to allow compression on tables. Enabling compression in OFPTM may reduce a database footprint and may facilitate reclaiming file system space when the data size shrinks.

In some embodiments, having one file per table set to ON to produce the OFPTM allows actions associated with distributing a database across nodes. It may be difficult, if even possible at all, to distribute database data across nodes while all the data resides in a single file.

In some embodiments, having one file per table set to ON to produce the OFPTM facilitates tuning the location of a table's data file to suit the hardware on which it runs, which may in turn produce performance gains. For example, when OFPTM is enabled, it may become possible to store different tables on different devices based on access frequency. For example, tables that are accessed above a threshold level may be stored on faster devices (e.g., solid state drives (SSD)) and tables that are accessed less than the threshold level may be stored on slower devices (e.g., spinning disk). Similarly, tables above a threshold size may be stored on a first type of device while tables below the threshold size may be stored on a second type of device.

Unfortunately, changing from one mode (e.g., SMFM) to another mode (e.g., OFPTM) or changing in the other direction (e.g., from OFPTM to SMFM) may force already stored data to be rewritten to support the new mode. This may take an unacceptable amount of time. The amount of time may be too long because conventional actions may include shutting down all applications that are using the database and then making a backup of the database binary files. The actions may also include starting an application (e.g., MySQL), using the application to dump data and table definitions, and then shutting down the application. A configuration file may then need to be reset. Disk space may finally be reclaimed by removing the old database file. The application (e.g., MySQL) may then be started again. The application may then be used to restore table definitions, after which an alter table command can be issued to allow compression. After all this, the data may be restored with the new mode in place. Testing of this conventional mysqldump approach on some production systems yielded conversion times of up to fourteen hours, which may be unacceptable. Sample conversion times for different sized databases are provided below.

100 million row table, KEY_BLOCK_SIZE=4, 25 G total db size
 Total elapsed time: 01 hour(s) 25 min(s) 05 sec(s)
 mysqldump time: 02 min(s) 29 sec(s)
 mysqlrestore time: 01 hour(s) 20 min(s) 19 sec(s)
200 million row table, KEY_BLOCK_SIZE=4, 49 G total db size
 Total elapsed time: 02 hour(s) 39 min(s) 45 sec(s)
 mysqldump time: 05 min(s) 18 sec(s)
 mysqlrestore time: 02 hour(s) 34 min(s) 09 sec(s)
1,000,000,000 row table, KEY_BLOCK_SIZE=4, 241 G total db size
 Total elapsed time: 14 hour(s) 29 min(s) 39 sec(s)
 mysqldump time: 25 min(s) 37 sec(s)
 mysqlrestore time: 13 hour(s) 33 min(s) 14 sec(s)
Conventional attempts to produce conditions where space can be reclaimed make the master db unavailable for too long. Conventional attempts to produce conditions where compression can be used or where tables can be distributed also make the master db unavailable for too long. Conventional approaches that have been provided by database product providers to reduce the global tablespace file using a mysqldump and restore may require too much down time.

For certain specific databases, some attempts may have been made to issue an alter table command and then reclaim the database table space without rewriting the table file. These attempts have failed. It appears the only way to reclaim file system space in these specific databases is to delete the ibdata file using an rm command. Then, once the ibdata file has been removed, it appears the only way to re-populate the database with usable data is to restore the data via SQL. The restore is made from a dump produced by mysqldump. There appears to be no way to copy in a compressed ibd file from a previous mysql instance and have MySQL use the copied in data without rewriting the entire data file using either the restore or optimize command. As illustrated above, this takes an unacceptable amount of time.

A reason why these conventional attempts may have failed include the fact that the global file contains table related data and not the data in the tables itself. This table related data is intimately tied to the ibd table data file for which it was created. The data in the global file is specific to how and/or where MySQL has stored things on disk so it is impossible to move data files around after they have been created without the accompanying ibdata file they were created under. Thus, it appears that it is impossible to move in per-table data files after removing the global file they were created under. In other words, MySQL must perform work to fill its global file with the appropriate metadata it needs to access the per-table data file. When the global table file is removed to reclaim file system space, the only way for MySQL to use the per-table files it had previously written is to re-write the data again, which takes an unacceptable amount of time. During this lengthy process, the new, smaller global ibdata file is populated with the necessary bits to use the new per-table data file being written. For this and other reasons, it may not be possible to change modes within a single MySQL instance.

Example apparatus and methods may therefore cause a master SQL db to transition between modes using a second instance of a copy of the master db where new data files in the second instance are created from scratch. This approach transitions from SMFM to OFPTM with minimal down time. A first instance is established for the original instance of the master db. Replication is enabled on the master db. The first instance is dumped to produce a second instance, which is rebuilt in the second mode. When the rebuild is completed, the rebuilt second instance is synchronized to the master. Once synchronization is achieved, a failover to the second instance is caused or the second instance is copied back into the master. This approach allows the second instance to be created writing data using the per-table-files with a working global ibdata file while the original instance remains online. The global tablespace ibdata file of the second instance will have had file-per-table on and thus will be small. Once the sync has completed, there will be some down time to switch the application to use the data files created in the second instance. However this down time is minimal compared to the down time associated with conventional approaches. For example, the down time may be limited to the LOCK TABLE time required to create the master dump, and to the time needed to switch to the second instance once the sync has completed. Once the application is back up and running, the application will use the per-table data files generated in the second instance.

In one embodiment, specific steps to prepare the first instance may include enabling replication permission, locking tables and creating a master dump, setting up a configuration file (e.g., my.cnf) for replication, establishing a server identifier, and shutting down and restarting the server. Specific steps to create the second instance may include creating a new directory, copying the database directory from the first instance into the new directory, removing a configuration file (e.g., db/auto.cnf) to force generation of a new UUID for the second instance, creating directories (e.g., config, journal, logs, share, tmp), setting database user permissions and ownership, and setting up a configuration file (e.g., my.cnf) for the second instance. The second instance may then have file-per-table enabled and the innodb_file_format option may be set.

The second instance may then be started using, for example, a no slave start. The dump may then be imported from the master. Once the dump has been imported, change master commands may be issued on the slave to start replication. Later, when processing is complete, changing over to use data files in the second instance may be performed. In one embodiment, specific steps for the changeover may include, locking the original instance for writes and allowing the second instance to sync with the original instance. When the sync is complete, then both the original instance and the second instance may be shut down. While shut down, the second instance may be cleaned and then data files may be moved to the first instance. When the data files have been moved, then a final configuration file (e.g., my.cnf) may be created. At this point, replication options may be removed, file-per-table mode may be enabled for the original instance, and replication privileges may be undone. At this point, the application will run with file-per-table enabled using a smaller global ibdata file.

While the above-described approach reduces down time, further reductions may be possible using example apparatus and methods. To have a static dump of the data, the mysqldump must be run with ALL TABLES LOCKED. Therefore the majority of the downtime in the process described above is taken by the mysqldump portion of the conversion process. For small installs, the mysqldump time is on the order of minutes. For larger installs, the mysqldump time is on the orders of several hours.

Example investigations of mysqldump timing from production systems yielded the following results:
  ibdata1 size: 3.6 GB
  actual data size: 2119 mb
  index size: 1197 mb
  total mysqldump duration: 1:41~=101 sec
  ibdata1 size: 17 G
  actual data size: 5929 mb
  actual index size: 5391 mb
  total mysqldump duration: 4:35~=275 sec
  ibdata1 size: 13 G
  actual data size: 5048 mb
  actual index size: 5539 mb
  total mysqldump duration: 3:10~=190 sec
  ibdata1 size: 766 G
  actual data size: 275695 mb=~275 G
  actual index size: 225327 mb=~225 G
  total mysqldump duration: 5:23:46~=19426 sec Actual data size as an indicator of time required appears to yield the most consistent results for gauging total mysqldump duration. Using the maximum duration for the example data points yields a conservative estimate of a rate of 70 sec/gb. For some users this will rate will be acceptable, for others like those having installs like the 766 GB example this may be unacceptable. Therefore, additional efforts may be made to further reduce down time.

In one embodiment, when the use of more disk space is acceptable, using mysqlbackup's low downtime backup property to create a copy of the main database to use as a seed for the mysqldump can reduce the overall application downtime. In this embodiment, the seed instance is used in place of the first instance in the approach described above to create the dump. The seed instance has its tables locked during mysqldump while the main instance is still running and servicing an application. The logfile and position from mysqlbackup is then used to sync the second instance with the running main instance using replication. This further reduces application down time by using more disk space.

This section examines the space used by example systems and methods and conventional approaches that just use mysqldump. Consider a database whose ibdata file size is 800 gb and holds 160 gb of actual data. For the conventional method that does conversion in place using mysqldump, with tables locked, mysqldump reads data and writes to a single file. It only writes the data itself, (e.g., 160 GB) but must read this from mysql server and write it to plain text in a file. Thus, mysqldump writes approximately 160 GB. The space used to create a second instance with this method is 1×initial ibdata+pure data size. The downtime duration will be approximately equal to the mysqldump duration. A worst case for an 800 GB database conversion will require 960 GB of disk space (e.g., 800 GB+160 GB=960 GB).

For an example method that uses mysqlbackup and two slave instances, mysqlbackup will read and write 800 GB to create the backup. This may be done without locking the tables for the entire duration, even though at the end of the backup process tables are locked for a short time (e.g., seconds). The tradeoff for achieving the short downtime is increased on-disk usage because three copies of the data exist simultaneously: 1× ibdata for the primary, 1× ibdata for the seed, and 1× raw data for mysqldump output. In this embodiment, an 800 GB database conversion will require 1760 GB of disk space (e.g., 2×800 GB+160 GB=1760 GB). While more disk space is used, less time is consumed.

Another tradeoff associated with the mysqlbackup approach is increased overall conversion duration. The total length of the example process is extended by the mysqlbackup duration. While the overall duration is greater, the downtime is much less compared to a conventional approach.

In one embodiment, a method may be selected based on the specific requirements for an installation. For example, for a low resource system with a database that is less than a threshold size, a conventional mysqldump and restore method may be performed. However, for a large system with excess resources (e.g., disk space), the mysqlbackup with two slave instance method may be performed.

Figure 4:
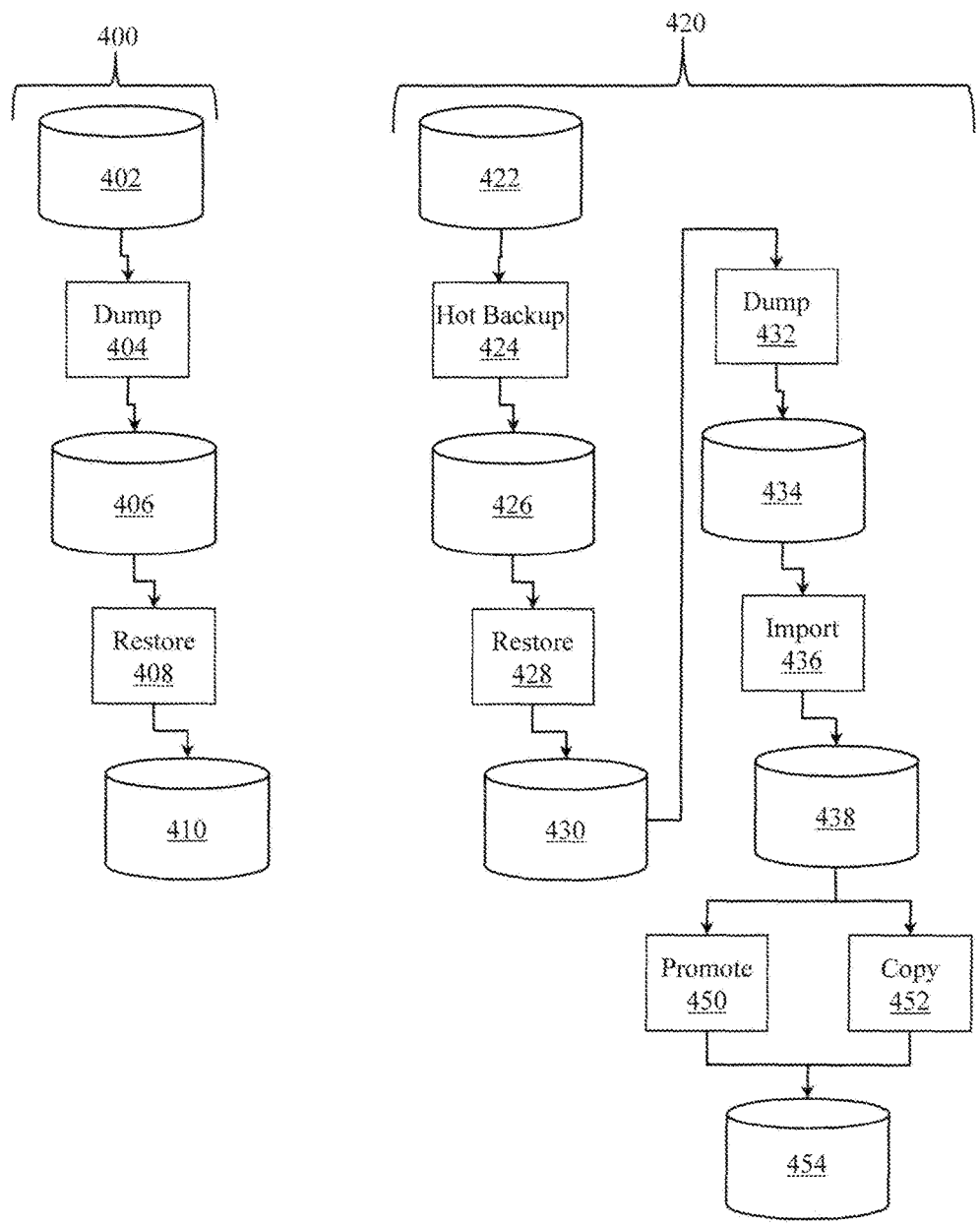
FIG. 4 illustrates a conventional data flow and an example data flow for converting a database from SMFM to OTPFM.

FIG. 4 illustrates a conventional data flow 400 and an example data flow 420 for converting a database from SMFM to OTPFM. The conventional data flow 400 may use a mysqldump and restore approach. Data flow 400 begins with a master database 402 where all table information is in a single file. Processing begins by locking or making the master database 402 unavailable. The master database 402 will remain locked or unavailable for an extensive period of time until data flow 400 is complete. Data flow 400 includes performing dump 404 from the master database 402 to produce a new database dump 406. The database dump 406 is imported with one file per table set to ON by restore 408 back into the production system to make a "new" master db 410. When the restore 408 is done, the new master database 410 replaces the prior master db 402. At this point the master db may be unlocked or made available.

Data flow 420 illustrates a data flow 420 performed by one example apparatus and method. Data flow 420 may use a hot backup with two slave instances approach. Because a second instance of the database 422 is used, database 422 is locked and unavailable for a significantly smaller amount of time than is database 402 in data flow 400. Data flow 420 starts with a master database 422 that has table data in a single file. Rather than make a dump from master database 422, a hot backup 424 process is performed to produce a binary backup 426. The binary backup 426 can be used by a restore process 428 to produce a first instance 430. Replication may be enabled on master db 422. A dump process 432 produces db dump 434 from the slave db 430. An import process 436 then produces a version of the second slave db 438 in one file per table format that is synchronized to the master db 422. At this point master db 422 and second slave db 438 can be locked or halted, and one of two different actions can be performed. Action 450 may be part of a failover process that promotes the second slave db 438 to be the new master db 454. Action 452 may copy the information from second slave db 438 into the master db 454 (which replaces master db 422).

The detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
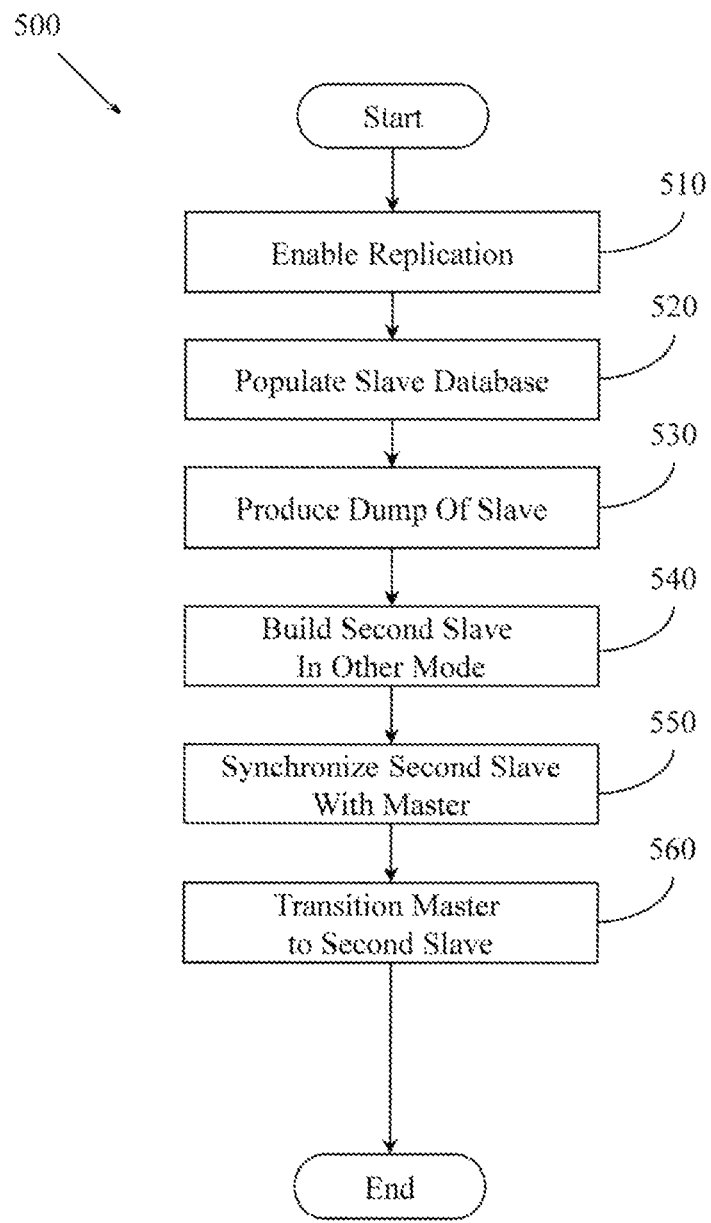
FIG. 5 illustrates an example method associated with converting a database from SMFM to OTPFM or OTPFM to SMFM.

FIG. 5 illustrates an example method 500 associated with converting a database from SMFM to OTPFM. In one embodiment, method 500 transitions a master structured query language (SQL) database operating in a first mode to an SQL database operating in a second mode. The first and second modes may include a single monolithic file mode where table information for separate tables in a database is stored in a single monolithic file and a one table per file and one file per table mode where table information for separate tables in a database is stored in separate files. In one embodiment, the first mode is the single monolithic file mode and the second mode is the one table per file and one file per table mode. In another embodiment, the first mode is the one table per file and one file per table mode and the second mode is the single monolithic file mode.

Method 500 includes, at 510, enabling replication for the master database. While starting replication is shown before populating the slave database, in different embodiments the replication may be started at different times after the slave database is instantiated. Starting replication may include, for example, making a procedure call to a database program that specifies a source and a target.

Method 500 also includes, at 520, populating a slave database for the master database. The slave database is populated while the master database is unlocked. The slave database is populated from the master database using a backup tool. The backup tool may be, for example, a binary hot backup tool. In one embodiment, the backup tool is mysqlbackup.

Method 500 also includes, at 530, producing a dump of the slave database. Since the dump is made from the slave database instead of from the master database, the dump may be made while the master database is unlocked, which reduces the amount of time the master database is locked as compared to conventional transition approaches. Producing a dump of the slave database may include making a procedure call to a database program that specifies a source and a target. The procedure call may be, for example, mysqldump.

Method 500 also includes, at 540, building a second slave database. The second slave database is built in the second mode. The second slave database is built from the dump of the slave database, not from the master database. Thus, the second slave database can be built while the master database is unlocked. Since the second slave is built in the second mode from a copy of the slave database, opportunities may exist during the build to optimize space usage or to perform other cleaning operations. Building the second slave database may include making a procedure call to a database program. The procedure call may be, for example, a build or rebuild command.

Method 500 also includes, at 550, synchronizing the second slave database with the master database from the point where replication was started. Synchronizing the second slave database may include making a procedure call to a database program. The procedure call may be, for example, a sync command and may specify a source and a target.

Method 500 also includes, at 560, transitioning the master database to the second slave database. Transitioning the master database to the second slave database may be performed in different ways. In one embodiment, transitioning the master database to the second slave database includes locking the master database, copying at least a portion of the second slave database to the master database, and then restarting the master database in the second mode. In another embodiment, transitioning the master database to the second slave database includes causing a failover from the master database to the second slave database. The failover may be caused by sending a signal to a database program, by making a procedure call, by generating an electrical signal on a control line, or in other ways.

Figure 6:
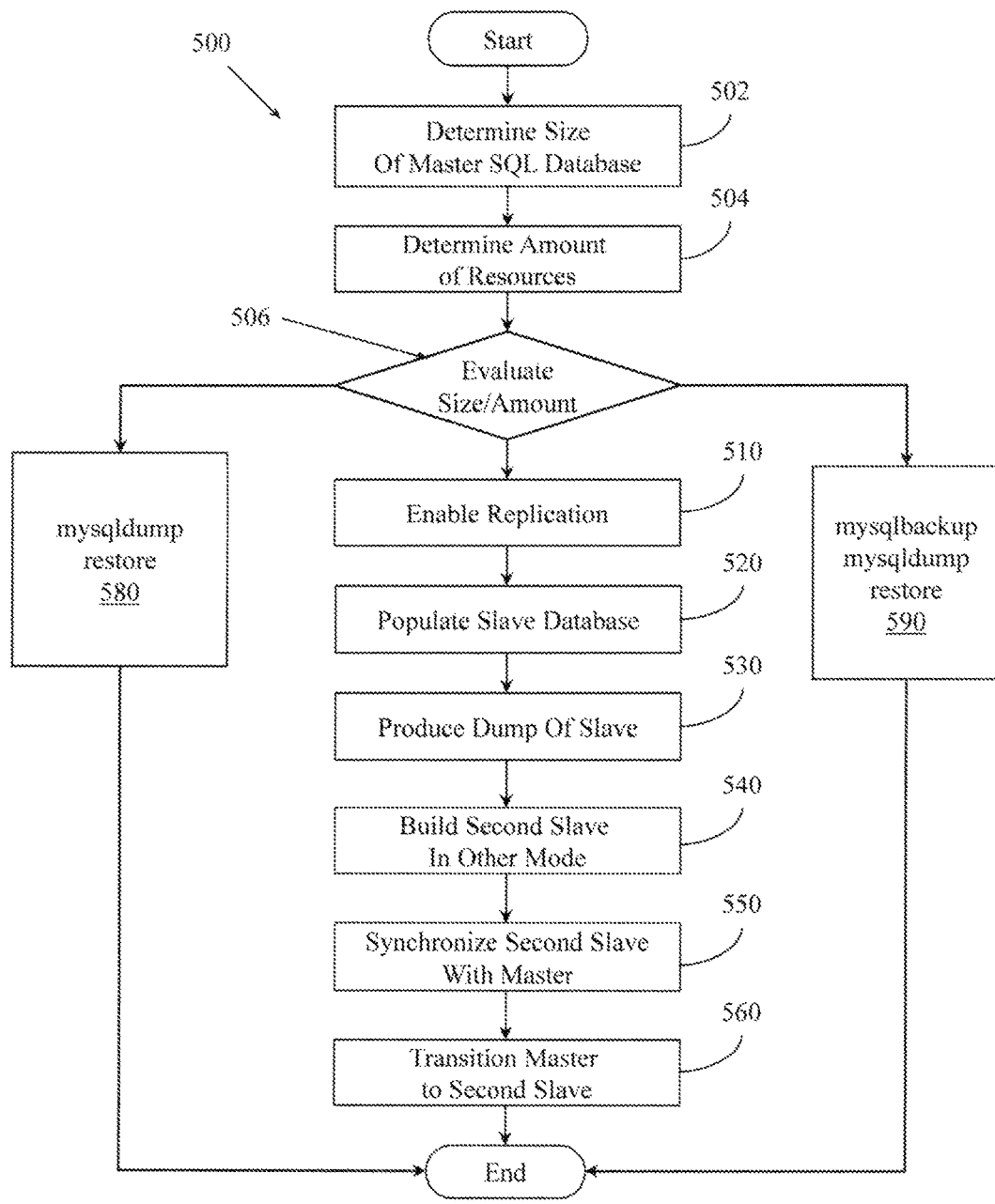
FIG. 6 illustrates an example method associated with converting a database from SMFM to OTPFM or OTPFM to SMFM.

FIG. 6 illustrates another embodiment of method 500. This embodiment also includes, at 502, determining a size of a master database to be transitioned from a single table file mode to a multi table file mode. This embodiment also includes, at 504, determining an amount of storage available for transitioning the master database. Decisions on how to transition the master database can then be made at 506 based, at least in part, on the size of the master database and/or on the amount of storage available for the transition.

In one embodiment, upon determining that the size does not meet a threshold size, method 500 may proceed to transition the master database from the single table file mode to the multi table file mode in place using a conventional mysqldump and restore approach 580. In one embodiment, upon determining that the size does meet the threshold size at 506, method 500 may proceed to transition the master database from the single table file mode to the multi table file mode using the two slave approach illustrated from 510 through 560.

In another embodiment, the decision at 506 may be based on a combination of the size of the master database and the amount of resources available. The combination may be evaluated in light of a number of states. If a first state is met, then method 500 may transition the master database from the single table file mode to the multi table file mode in place using the conventional mysqldump and restore approach illustrated at 580. The first state may be, for example, the size of the master database being below a threshold size and the amount of resources being below a threshold amount.

If a second state is met, then method 500 may transition the master database from the single table file mode to the multi table file mode using the two slave approach illustrated from 510 through 560. The second state may be, for example, the size of the master database being above a threshold size and the amount of resources being above a threshold amount.

If a third state is met, then method 500 may transition the master database from the single table file mode to the multi table file mode in place using a hybrid approach 590 that uses the conventional mysqldump and restore approach but applied to a copy of the master database produced by the backup tool. The third state may be, for example, the size of the master database being below a threshold size but the amount of resources available being above a threshold amount. While transitioning the master database from the single table file mode to the multi table file mode is used in connection with FIG. 6, transitions in the other direction may be performed similarly.

While FIGS. 5 and 6 illustrate various actions occurring in serial, it is to be appreciated that various actions illustrated in FIG. 5 or 6 could occur substantially in parallel. By way of illustration, a first process could instantiate and populate a slave db, a second process could handle replication for the master, a third process could build the new db in OTPFM and a fourth process could transition a system from the original SMFM db to the new OTPFM db. While four processes are described, it is to be appreciated that a greater or lesser number of processes could be employed and that lightweight processes, regular processes, threads, and other approaches could be employed.

In one example, a method may be implemented as computer executable instructions. Thus, in one example, a non-transitory computer-readable storage medium may store computer executable instructions that if executed by a machine (e.g., computer) cause the machine to perform methods described or claimed herein including method 500. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
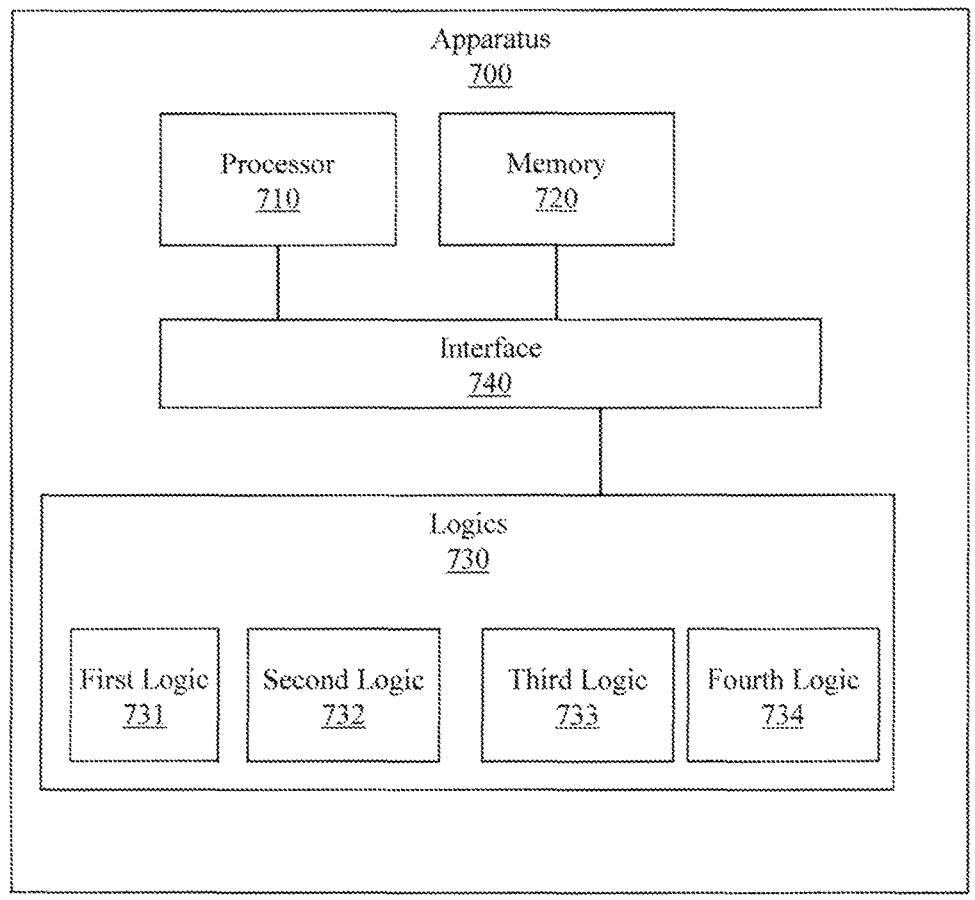
FIG. 7 illustrates an example apparatus associated with converting a database from SMFM to OTPFM or OTPFM to SMFM.

FIG. 7 illustrates an example apparatus 700 associated with converting a database from SMFM to OTPFM or OTPFM to SMFM. Apparatus 700 includes a processor 710, a memory 720, a set of logics 730, and an interface 740 that connects the processor 710, the memory 720, and the set of logics 730. The set of logics 730 includes a first logic 731, a second logic 732, a third logic 733, and a fourth logic 734. In one embodiment, the functionality associated with the set of logics 730 may be performed, at least in part, by hardware logic components. The hardware logic components may include but are not limited to, field-programmable gate arrays (FPGAs), application specific integrated circuits (ASICs), application specific standard products (ASSPs), system on a chip systems (SOCs), graphic processing units (GPUs), or complex programmable logic devices (CPLDs). In one embodiment, individual members of the set of logics 730 are implemented as ASICs or SOCs.

First logic 731 copies data from a master database to a slave database while the master database is available for access. In one embodiment, the master database may be a master SQL database. In different embodiments, being available for access may include being available for read access and for write access or just for read access. The master database operates in a first of two modes that include a single file mode where table information for separate tables in the database is stored in a single file (SMFM) and a one file per table mode (OTPFM) where the table information for separate tables is stored in separate files. In one embodiment, the master database starts in the single file mode and is transitioned to the one file per table mode. In another embodiment, the master database starts in the one file per table mode and is transitioned to the single file mode.

Second logic 732 rebuilds a copy of the slave database in a second of the two modes. For example, if the master database starts in the single file mode the second logic 732 rebuilds the copy of the slave database in the one file per table mode, and if the master database starts in the one file per table mode the second logic 732 rebuilds the copy of the slave database in the single file mode. Thus, in one embodiment, the copy of the slave database will only have ever been in the intended final mode. This rebuilding takes input from the backup of the master database that was put in the slave database and outputs a second copy of the slave. Thus, the rebuilding can be done without having to shut down the master database. Replication data for the period during which the backup is made and for the period during which the rebuild is being performed is available to synchronize the rebuilt slave with the master.

Third logic 733 synchronizes the copy of the slave database to the master database using replication data provided by the master database. The master database may have had replication enabled before, during, or after the slave database was populated. By having the replication data available, the copy of the slave database can be synchronized while the master database is still running. The third logic 733 therefore synchronizes the copy of the slave database to the master database while the master database is available for access. This further mitigates the impact of lock or downtime for the master database associated with conventional approaches.

Fourth logic 734 transitions the master database to the copy of the slave database. In one embodiment, the fourth logic 734 transitions the master database to the copy of the slave database by causing a failover. A failover may be caused by sending a signal to a database program, by making a procedure call, or in other ways. In another embodiment, the fourth logic 734 transitions the master database to the copy of the slave database by copying data from the copy of the slave database to the master database. The master database may not be available during the failover or copying, however this period of time is significantly less than the period of time for which a master database is unavailable during a conventional mysqldump and restore approach.

Figure 8:
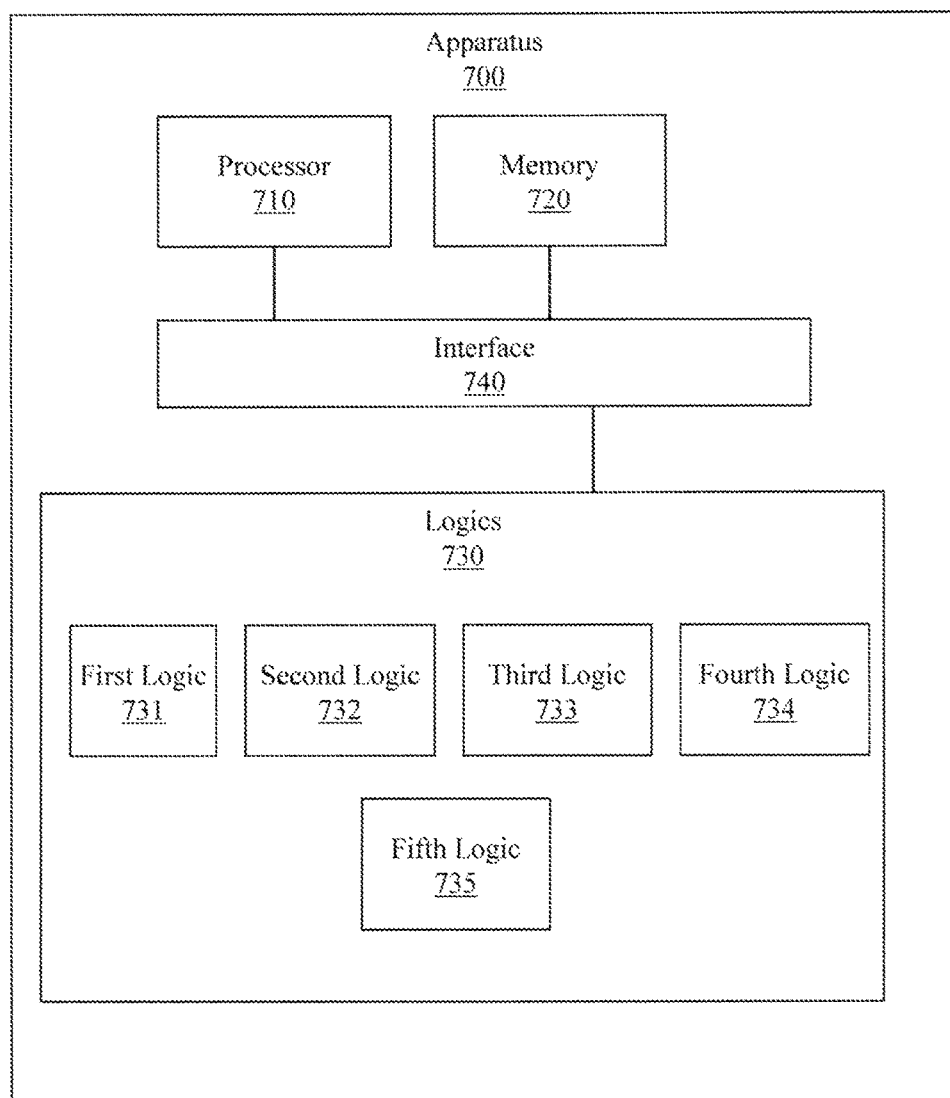
FIG. 8 illustrates an example apparatus associated with converting a database from SMFM to OTPFM or OTPFM to SMFM.

FIG. 8 illustrates another embodiment of apparatus 700 that includes fifth logic 735. Fifth logic 735 facilitates selecting between different ways to transition the master database. Fifth logic may select, based on the size of the master database, on the resources (e.g., storage) available for the transition, or based on a combination of factors. Thus, fifth logic 735 determines a size of the master database and an amount of resources available to transition the master database. Based, at least in part, on the size and the amount, the fifth logic 735 may decide to control the second logic 732, the third logic 733, and the fourth logic 734 to transition the master database using the copy of the slave database. The fifth logic 735 may also decide to control mysqldump and restore tools in the database to transition the master database in place rather than using the second logic 732, third logic 733, and fourth logic 734 to perform the mysqlback two slave approach. For example, when the master database to be transitioned is small and there is little extra memory available, using the conventional mysqldump and restore process may be appropriate. However, when the master database is large and there is significant extra memory available, then the mysqlbackup with two slave copies approach may be appropriate. The fifth logic 735 may even decide to perform a hybrid method. For example, the fifth logic 735 may decide to control mysqldump and restore tools in the database to transition the master database from a single slave database.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software in execution on a machine, or combinations of each to perform a function(s) or an action (s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method for transitioning a master database operating in a first mode to a database operating in a second mode, comprising:
   while the master database is unlocked, populating a slave database for the master database from the master database using a backup tool;
   enabling replication for the master database;
   producing a dump of the slave database while the master database is unlocked;
   building, in the second mode, from the dump of the slave database, while the master database is unlocked, a second slave database;
   synchronizing the second slave database with the master database from the point where replication was started; and
   transitioning the master database to the second slave database,
   where the first mode and the second mode include a single monolithic file mode where table information for separate tables in a database is stored in a single monolithic file and a one table per file and one file per table mode where table information for separate tables in a database is stored in separate files.

2. The method of claim 1, where the master database is a structured query language (SQL) database.

3. The method of claim 1, where the first mode is the single monolithic file mode and the second mode is the one table per file and one file per table mode, or where the first mode is the one table per file and one file per table mode and the second mode is the single monolithic file mode.

4. The method of claim 1, where transitioning the master database to the second slave database comprises:
   locking the master database;
   copying at least a portion of the second slave database to the master database; and
   restarting the master database in the second mode.

5. The method of claim 1, where transitioning the master database to the second slave database includes causing a failover from the master database to the second slave database.

6. The method of claim 1, where the backup tool is a binary hot backup tool.

7. The method of claim 1, where the backup tool is mysqlbackup.

8. A method, comprising:
   determining a size of a master SQL database to be transitioned from a single table file mode to a multi table file mode;
   upon determining that the size does not meet a threshold size,
      transitioning the master SQL database from the single table file mode to the multi table file mode in place using a mysqldump and restore approach;
   upon determining that the size does meet the threshold size,
      transitioning the master SQL database from the single table file mode to the multi table file mode using a two slave approach, where the two slave approach comprises:
      populating a first slave database for the master SQL database from the master SQL database using a backup tool, where the first slave database is configured in the single table file mode;
      starting replication for the master SQL database;
      producing a second slave database from a dump of the first slave database, where the second slave database is created in the multi table file mode;
      synchronizing the second slave database with the master SQL database from the point where replication was started; and
      transitioning the master SQL database to the second slave database.

9. The method of claim 8, where the backup tool is a binary hot backup tool.

10. The method of claim 8, where the backup tool is mysqlbackup.

11. The method of claim 8, comprising:
   determining an amount of storage available for transitioning the master SQL database;
   upon determining that a combination of the size and the amount does not meet a combined threshold:

transitioning the master SQL database from the single table file mode to the multi table file mode in place using the mysqldump and restore approach;
upon determining that the combination of the size and the amount does meet the threshold size:
transitioning the master SQL database from the single table file mode to the multi table file mode using the two slave approach.

12. The method of claim 8, comprising:
determining an amount of storage available for transitioning the master SQL database;
upon determining that a combination of the size and the amount is in a first state:
transitioning the master SQL database from the single table file mode to the multi table file mode in place using the mysqldump and restore approach;
upon determining that the combination of the size and the amount is in a second state:
transitioning the master SQL database from the single table file mode to the multi table file mode using the two slave approach;
and
upon determining that the combination of the size and the amount are in a third state,
transitioning the master SQL database from the single table file mode to the multi table file mode in place using a mysqldump approach applied to a copy of the master SQL database produced by the backup tool.

13. An apparatus for transitioning a master database between two modes, comprising:
a processor;
a memory;
a set of logics; and
an interface to connect the processor, the memory, and the set of logics,
the set of logics comprising:
a first logic that copies data from the master database to a slave database while the master database is available for access, where the master database operates in a first mode of the two modes, the two modes including a single file mode where table information for separate tables in the database is stored in a single file and a one file per table mode where the table information for separate tables is stored in separate files;
a second logic that rebuilds a copy of the slave database in a second mode of the two modes,
a third logic that synchronizes the copy of the slave database to the master database using replication data provided by the master database, where the third logic synchronizes the copy of the slave database to the master database while the master database is available for access; and
a fourth logic that transitions the master database to the copy of the slave database.

14. The apparatus of claim 13, where the master database starts in the single file mode and is transitioned to the one file per table mode or where the master database starts in the one file per table mode and is transitioned to the single file mode.

15. The apparatus of claim 13, where the fourth logic transitions the master database to the copy of the slave database by causing a failover.

16. The apparatus of claim 13, where the fourth logic transitions the master database to the copy of the slave database by copying data from the copy of the slave database to the master database.

17. The apparatus of claim 13, where being available for access includes being available for read access and for write access.

18. The apparatus of claim 13, where being available for access includes being available for read access but not write access.

19. The apparatus of claim 13, comprising:
a fifth logic that determines a size of the master database and an amount of resources available to transition the master database, and selects, based on the size and the amount:
to control the second logic, the third logic, and the fourth logic to transition the master database using the copy of the slave database, or
to control mysqldump and restore tools in the database to transition the master database in place.

20. The apparatus of claim 13, comprising:
a fifth logic that determines a size of the master database and an amount of resources available to transition the master database, and selects, based on the size and the amount:
to control the second logic, the third logic, and the fourth logic to transition the master database using the copy of the slave database,
to control mysqldump and restore tools in the database to transition the master database in place, or
to control mysqldump and restore tools in the database to transition the master database from the slave database.

* * * * *